(12) United States Patent
Ishigaki et al.

(10) Patent No.: US 7,913,093 B2
(45) Date of Patent: Mar. 22, 2011

(54) METHOD AND SYSTEM FOR PROVIDING ACCESS TO INFORMATION ON AN ARTICLE TO WHICH A TAG IS COUPLED

(75) Inventors: Yoshinobu Ishigaki, Yokohama (JP); Masayuki Numao, Kawasaki (JP); Yuji Watanabe, Yokohama (JP); Madoka Yuriyama, Fujisawa (JP); Takeo Yoshizawa, Takatsu-ku (JP)

(73) Assignee: International Business Machines Corporation, Armonk, NY (US)

( * ) Notice: Subject to any disclaimer, the term of this patent is extended or adjusted under 35 U.S.C. 154(b) by 1102 days.

(21) Appl. No.: 11/571,896

(22) PCT Filed: Jul. 13, 2005

(86) PCT No.: PCT/JP2005/012938
§ 371 (c)(1),
(2), (4) Date: Jan. 10, 2007

(87) PCT Pub. No.: WO2006/009040
PCT Pub. Date: Jan. 26, 2006

(65) Prior Publication Data
US 2007/0226145 A1 Sep. 27, 2007

(30) Foreign Application Priority Data
Jul. 15, 2004 (JP) .................. 2004-208935

(51) Int. Cl.
*H04L 9/32* (2006.01)
(52) U.S. Cl. ...................... 713/189; 713/193
(58) Field of Classification Search .................. 726/1–3, 726/9–10, 26–27; 713/150, 154–155, 168, 713/170, 181, 192–194; 380/46
See application file for complete search history.

(56) References Cited

U.S. PATENT DOCUMENTS
7,000,834 B2 2/2006 Hind et al.
(Continued)

FOREIGN PATENT DOCUMENTS
JP 2002-319001 10/2002

OTHER PUBLICATIONS

"EPC Tag Data Standards Version 1.1 Rev .1.24", [online], EPCglobal, Apr. 1, 2004, [retrieved on Oct. 10, 2005], Retrieved from the Internet: <URL:http://www.epcglobalinc.com/standards_technology/EPCTagDataSpecification11rev124 pdf>.

(Continued)

*Primary Examiner* — Hosuk Song
(74) *Attorney, Agent, or Firm* — Schmeiser, Olsen & Watts; John Pivnichny

(57) ABSTRACT

A method and system for providing access to information on an article to which a tag is coupled. A local server reads the tag containing a virtual ID that includes an encryption of a bit string. The bit string includes an article ID containing a manufacturer ID. The local server is coupled to an ONS server, an ONS proxy server, and a PML server via a network. The local server sends to the ONS proxy server an ONS service request that includes the virtual ID and requests a network address of the PML server. The local server receives, from the ONS server, the network address of the PML server. The local server sends to the PML server, at the network address of the PML server, a PML information request that includes the virtual ID and requests article information. The local server receives, from the PML server, the article information.

20 Claims, 10 Drawing Sheets

U.S. PATENT DOCUMENTS 7,091,861 B2 * 8/2006 Schmidtberg et al. ...... 340/572.1
7,469,345 B2 * 12/2008 Shimada et al. .............. 713/193

OTHER PUBLICATIONS

"Technical Report 860MHz 60MHz Class I Radio Frequency Identification Tag Radio Frequency & Logical Communication Interface Specification Recommended Standard, Version 1.0.0", [online], Auto-ID Center, Nov. 14, 2002, [retrieved on Oct. 10, 2005], Retrieved from the Internet: <URL: http://www.autoidlabs.org/whitepapers/mit-autoid-tr007.pdf>.

Ari Juels, Ronald L. Rivest and Michael Szydlo, "The Blocker Tag: Selective Blocking of RFID Tags for Consumer Privacy", In Proceedings of 10th ACM Conference on Computer and Communications Security (CCS 2003), Oct. 2003, pp. 103 to 111.

Miyako Ohkubo, Koutarou Suzuki and Shingo Kinoshita, "Cryptographic Approach to "Privacy-Friendly" Tags", RFID Privacy Workshop, MIT, Nov. 15, 2003.

Stephen August Weis, "Security and Privacy in Radio-Frequency Identification Devices", Master's thesis, Massachusetts Institute of Technology, May 2003.

Yoshinobu Ishikawa, "Ubiquitous Jidai no ID Gijutsu (Sono 2)", [online], Business Innovator, Nikkei Business Publications, Inc., Jul. 8, 2003, [retrieved on Oct. 12, 2005], Retrieved from the Internet: <URL: http//nikkeibp.jp/style/bizinno/tech/article 20030708 shtml>.

Ronald L. Rivest, "All-Or-Nothing Encryption and The Package Transform" in Fast Software Encryption, LNCS, Springer-Verlag, 1997. pp. 210-218.

Masashi Shimizu, "Overview of RFID Technologies for Ubiquitous Services" IPSJ SIG Technical Reports, May 13, 2004, vol. 2004, No. 44, pp. 49-51. English Abstract.

Bart Eisenberg, "Pacific Connection No. 112" Software Design, Gijyutsu-Hyoron Co., Ltd., Apr. 18, 2004, No. Apr. 2004. pp. 194-201. English Abstract.

"Trend 2003 on IT/ID for distribution assistance(4), IT/ID New Trend(2)—Update on RFID in the U.S.", Material Flow Ryuken Co. Ltd., May 1, 2003, vol. 44-No. 5. pp. 96-100. English Abstract.

Nozawa Tetsuo, "Micro radio tag embedded in everything—product tracking via network became reality—Japan/US declared their candidacy of fomat for ID specification" Nikkei Communications, Japan, Nikkei Business Publication Inc, Feb. 3, 2003, vol. 393. pp. 78-80. English Abstract.

David Brock et al., 'EPC™ Tag Data Specification 1.0', Last Call Working Draft Version of Sep. 12, 2003, Auto-ID Center. 8 pages.

Christian Floerkemeier et al., 'PML Core Specification 1.0', Auto-ID Center Recommendation Sep. 15, 2003, Auto-ID Center. 48 pages.

Michael Mealling, 'Auto-ID Object Name Service (ONS) 1.0', Auto-ID Center Working Draft Aug. 12, 2003, Auto-ID Center. 17 pages.

Sean Clark et al., 'Auto-ID Savant Specification 1.0' Version of Sep. 1, 2003. 58 pages.

* cited by examiner

[Figure 1]
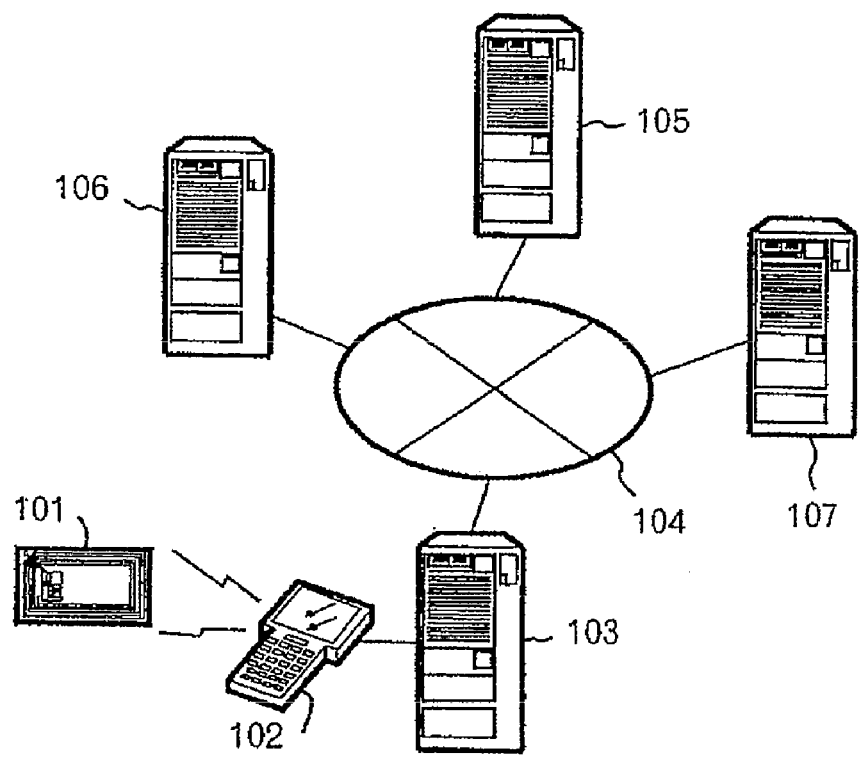
[Figure 2]
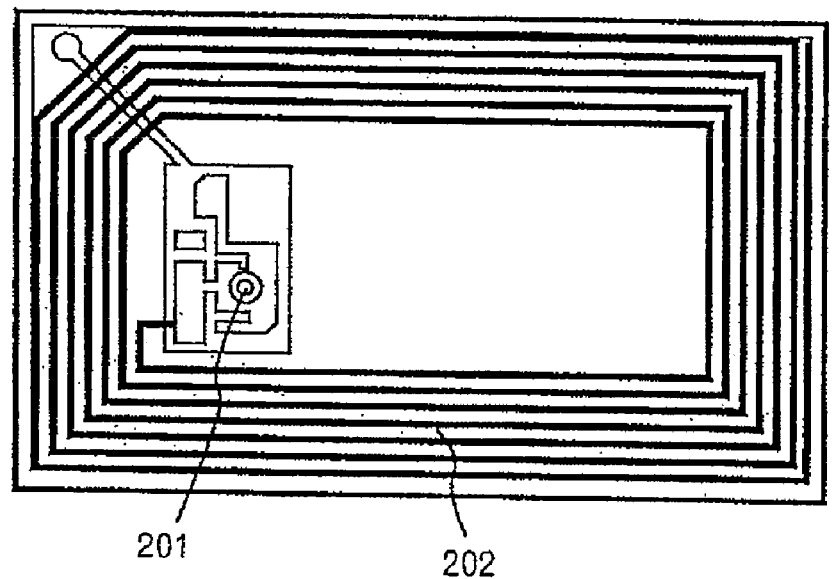

[Figure 3]
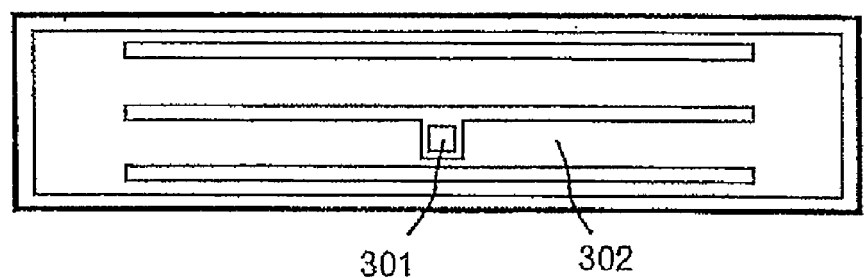
[Figure 4]
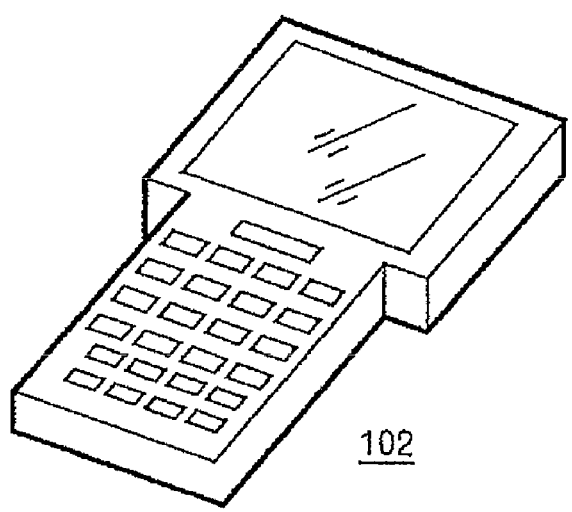

[Figure 5]
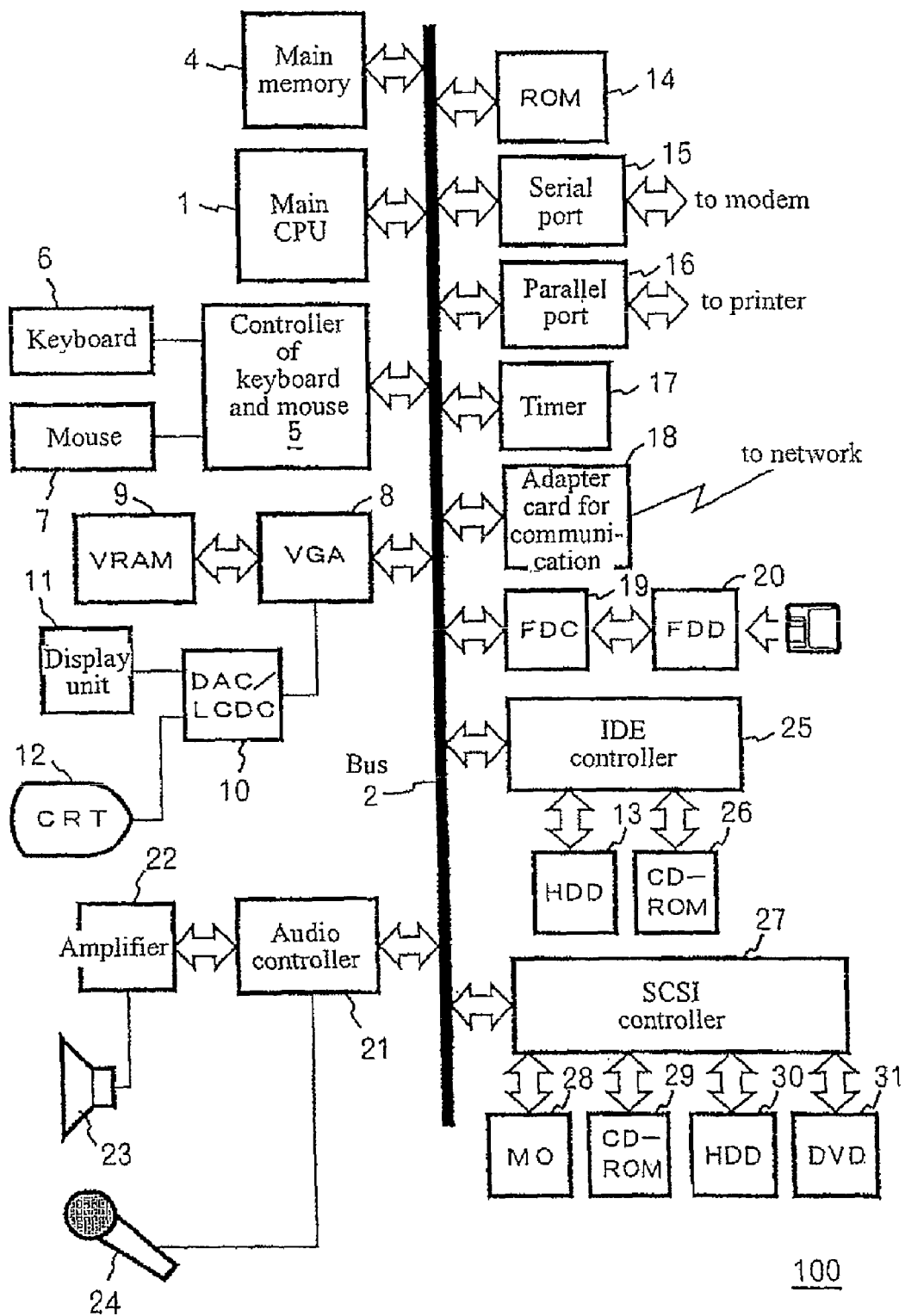

[Figure 6]
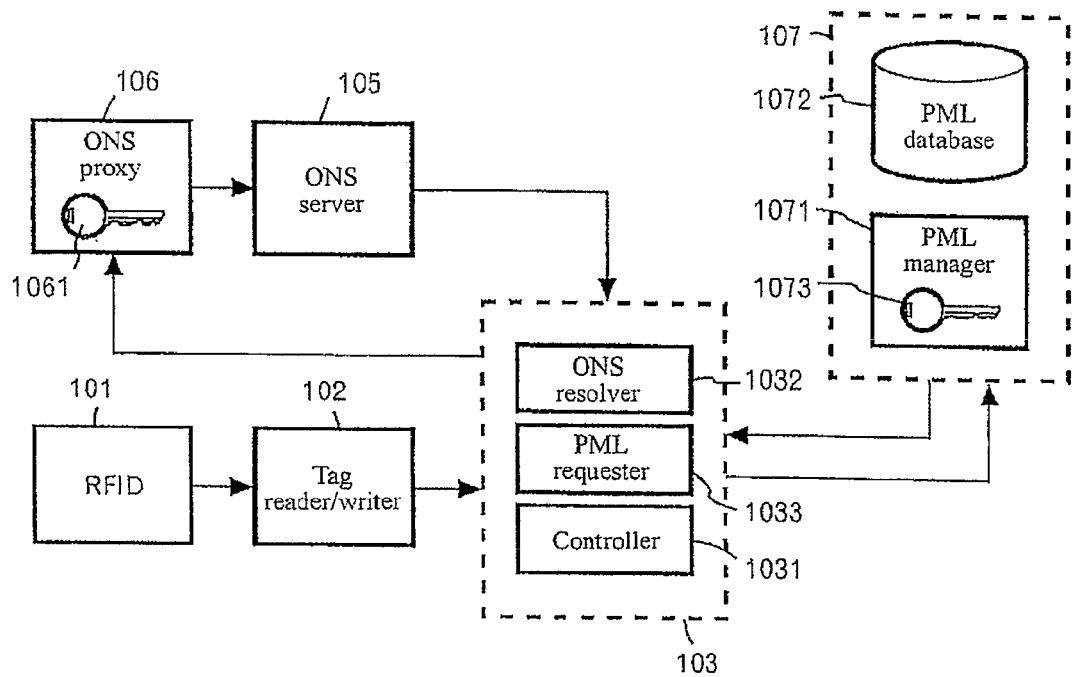
[Figure 7]
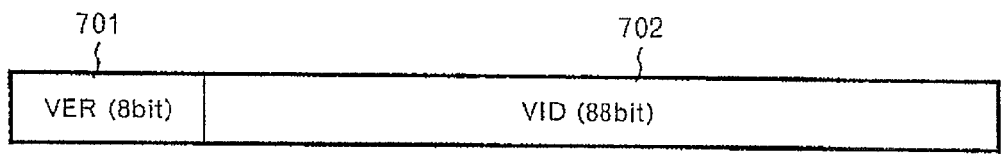
[Figure 8]
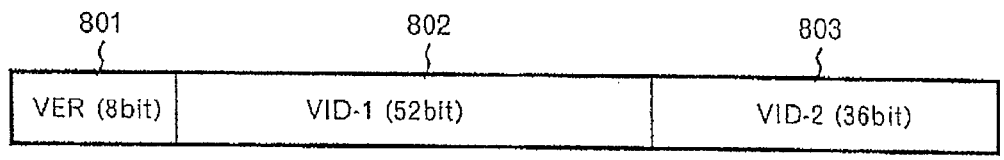
[Figure 9]
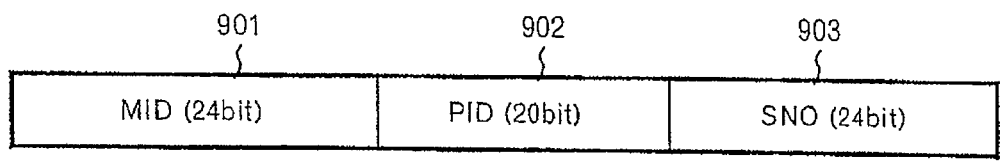

[Figure 10]
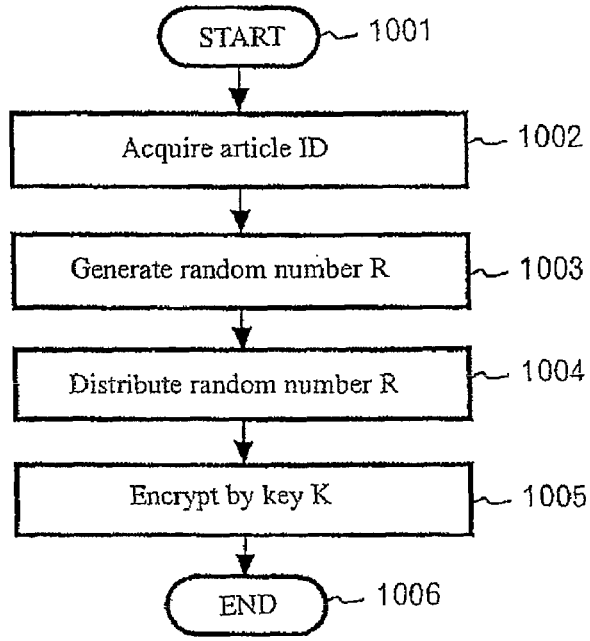
[Figure 11]
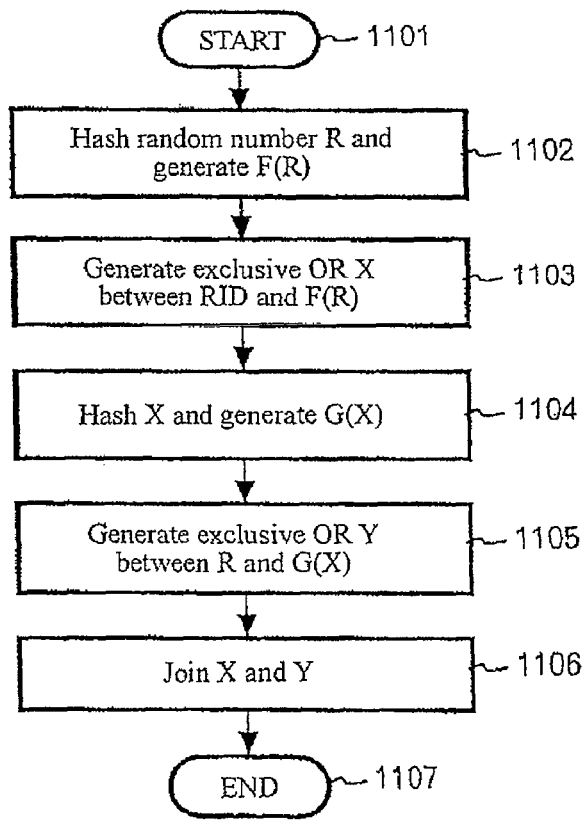

[Figure 12]
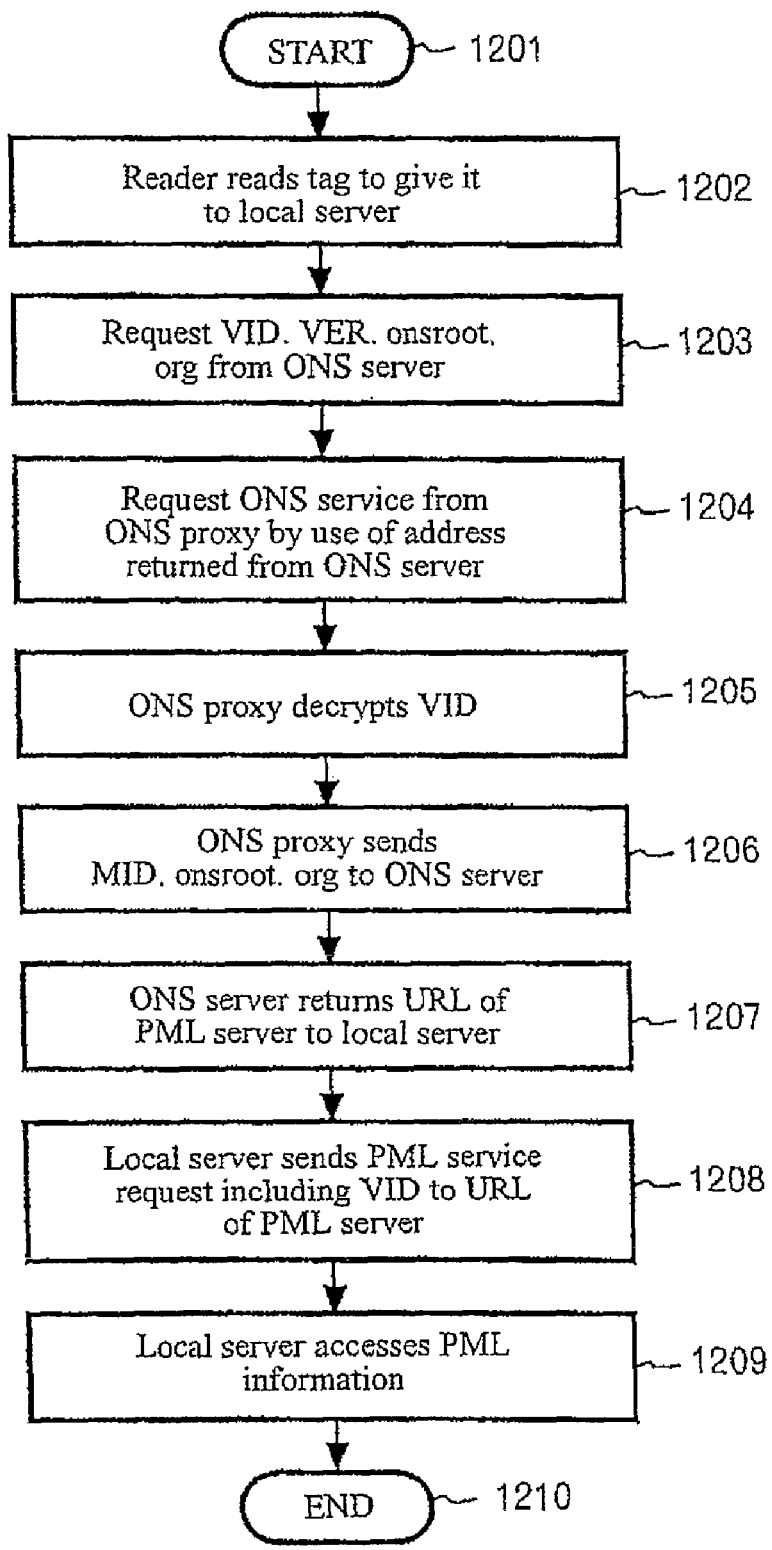

[Figure 13]
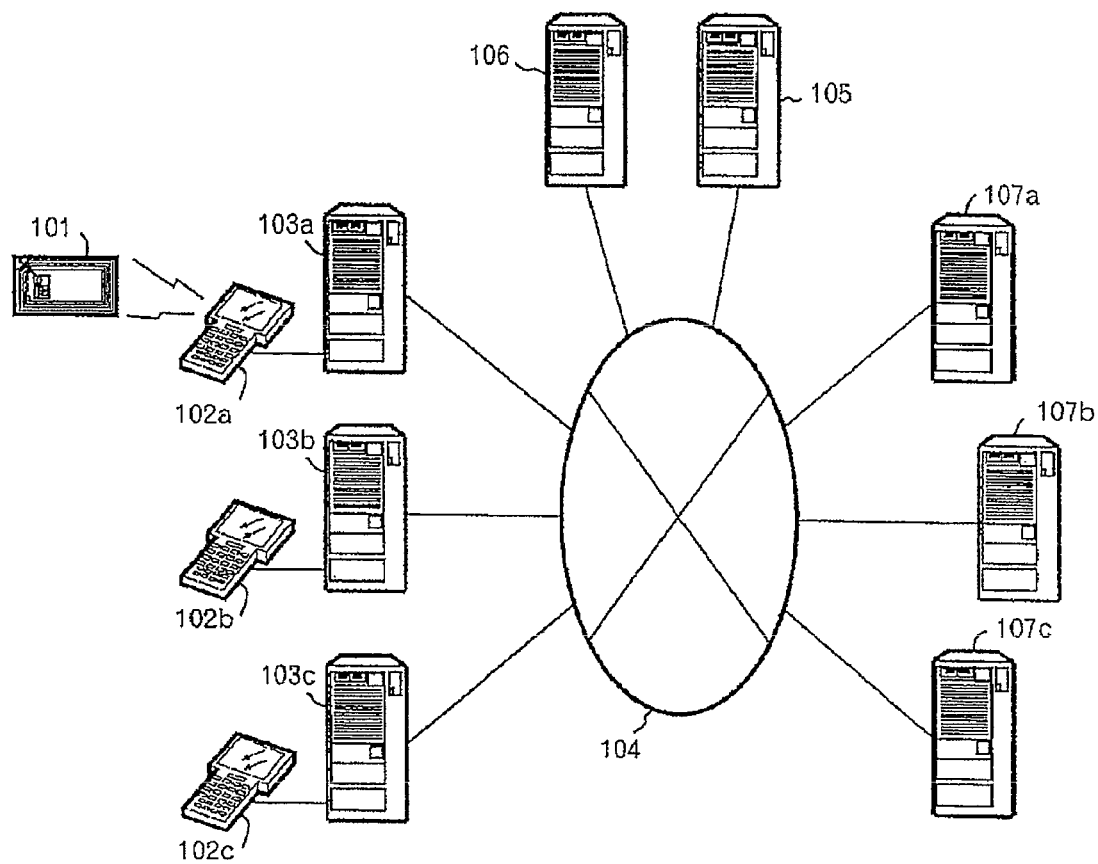

[Figure 14]
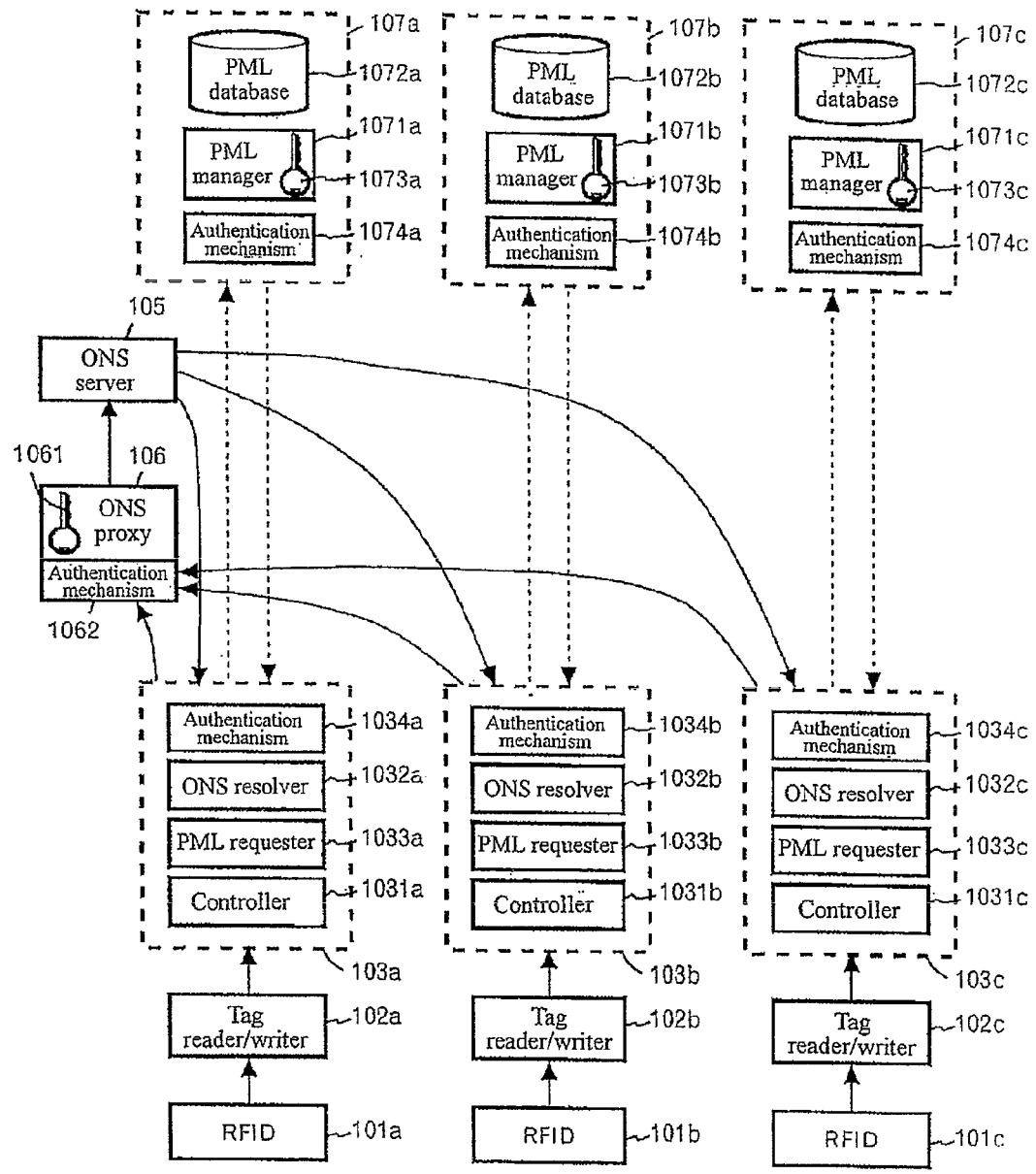

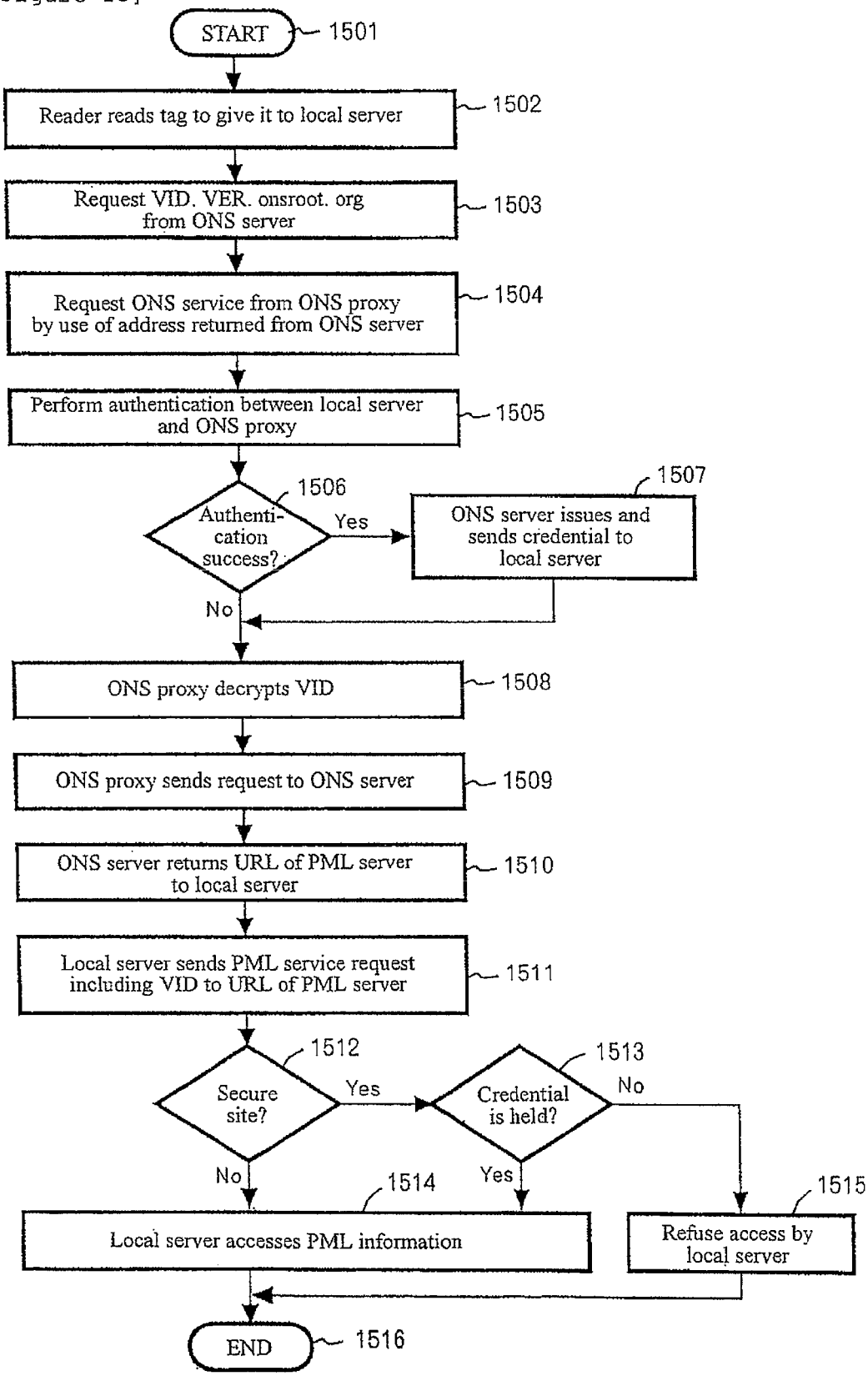
[Figure 15]

[Figure 16]
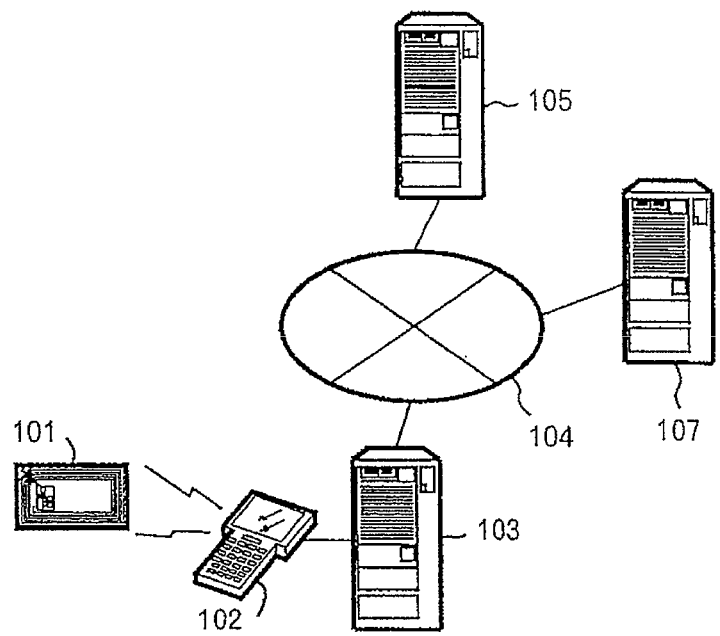
[Figure 17]
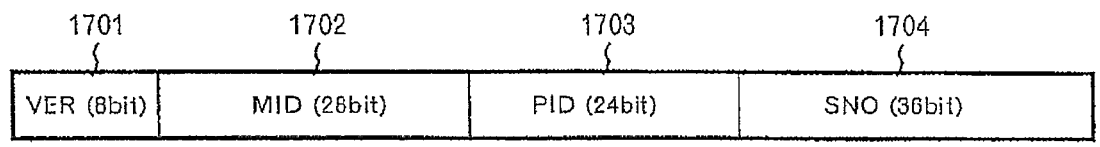

METHOD AND SYSTEM FOR PROVIDING ACCESS TO INFORMATION ON AN ARTICLE TO WHICH A TAG IS COUPLED

DETAILED DESCRIPTION OF THE INVENTION

1. Field of the Invention

The present invention relates generally to information processing technology, and more particularly to a method for accessing information on article with a tag attached thereon, a local server, an ONS proxy, a program, a tag creation method, a tag writer, a tag and a program for controlling an apparatus including a tag writer.

2. Background Art

In order to promote the efficiency of article circulation and the spread of article quality control by use of RFID (Radio Frequency Identification) tag, EPCglobal, a standardization group, has established the specifications (shown in FIG. 17) of EPC code that includes version information (VER) 1701 indicating tag data bit assignment, manufacturer ID (MID) 1702, product ID (PID) 1703 and product serial number (SNO) 1704 (refer to non-patent document 1).

Also, the standardization group, EPCglobal has proposed a framework (shown in FIG. 16) for accessing information on article with an RFID tag in which an Electronic Product Code (EPC) code is stored attached thereon. According to the framework, a local server 103 acquires an EPC code serving as article ID from data that is stored in an RFID tag 101 received via a tag reader 102. Subsequently, by use of the EPC code, the local server 103 requests the network address of a Physical Markup Language (PML) server 107 recording information on article with an RFID tag attached thereon via a network 104 from an Object Naming Service (ONS) server 105. Then, by use of the EPC code and the network address of the PML server 107 acquired from the ONS server 105, the local server 103 accesses the information on article with the tag attached thereon, which is stored in the PML server 107.

Data recorded onto an RFID tag can generally be read with an RFID tag reader of any type. Consequently, an EPC code recorded onto an RFID tag attached to an article worn by an individual may be read with a tag reader installed in a public space. Concerned about the privacy problem that an article worn by an individual may be grasped by anyone else, consumer groups have staged boycott movements against articles with an RFID tag, interfering with promotion of the efficiency of article circulation and the spread of article quality control by use of RFID tag.

As a method for coping with the privacy problem regarding RFID tag, there has been proposed Kill-Command for halting the function of RFID tag at the time when the article is bought by a consumer (refer to non-patent document 2). As another method, there has been proposed a function such that a blocker tag, which interferes with tag readers, blocks other tag data from being read (refer to non-patent document 3). As still another method for coping with the privacy problem, there has been proposed a method in which whenever data recorded onto an RFID tag is read, the data contents are rewritten with an external tag writer or by the tag itself (refer to non-patent documents 4 and 5).

[Non-patent document 1] Bud Babcock et al, "EPC Tag Data Standards Version 1.1 Rev. 1. 24," EPCglobal, Apr. 1, 2004

[Non-patent document 2] Auto-ID centre, "860-960 MHz Class I Radio Frequency Identification Tag Radio Frequency & Logical Communication Interface Specification Proposed Recommendation, Version 1. 0. 0,"Technical Report MIT-Auto ID=TR007, 2002

[Non-patent document 3] A. Juels et al, "The Blocker Tag: Selective Blocking of RFID Tags for Consumer Privacy," MIT RFID Privacy Summit, 2003

[Non-patent document 4] M. Ohkubo et al, "Cryptographic Approach to a Privacy Friendly Tag," MIT RFID Privacy Workshop, 2003

[Non-patent document 5] S. Weis, "Security and Privacy in Radio-Frequency Identification: Security Risks and Challenges," RSA Cryptobytes, Vol. 6, No. 1, 2003

DISCLOSURE OF THE INVENTION

Problems to be Solved by the Invention

The above described methods for coping with the privacy problem will sacrifice traceability that is the main object of introducing RFID tag, and/or will involve increased cost associated with introducing additional hardware mechanism.

An objective of the invention is to provide a method for accessing information on an article with a tag attached thereon, the method making it possible to prevent information on article worn by an individual from being grasped with a tag reader installed in a public space, without sacrificing traceability and without involving much increase in cost, a local server, an ONS proxy, a program, a tag creation method, a tag writer and a tag writer control program.

The above object can be achieved by combinations of the features described in the independent claims. The dependent claims define additional advantageous embodiments of the invention.

SUMMARY OF THE INVENTION

According to a first aspect of the invention, in a network system including a local server, an ONS proxy, an ONS server and at least one PML server, there is provided a method for providing access to information on an article associated with a tag, comprising the steps of: reading, by the local server, at least one encrypted virtual ID included in a tag; sending an ONS service request including the virtual ID from the local server to the ONS proxy; acquiring, by the ONS proxy, an article ID by decrypting the virtual ID by use of a key K; generating, by the ONS proxy, based on the article ID, a network address request for acquiring the network address of a PML server in which the information on article associated with the tag is stored, to send the request to the ONS server; receiving, by the local server, the network address of a PML server which the ONS server has returned in response to the network address request; sending, by the local server, based on the network address of a PML server, a PML service request including the virtual ID to the PML server; and providing, by the PML server, access to the information on article associated with the tag, which has been specified with the article ID acquired by decrypting the virtual ID by use of the key K, for the local server.

The first embodiment of the invention can be perceived as a network system, a local server, an ONS proxy, a program, a storage medium in which the program is stored, or as other program products.

According to a second aspect of the invention, there is provided a method for making, by using a tag writer, a tag including a virtual ID with a length of N bits is stored, the method comprising the steps of: storing an article ID with a length of (N−r) bits in a storage device; generating a random number R of r bits; generating a bit string with a length of N bits by distributing digits of the random number R of r bits within the bit string of the article ID with a length of (N−r)

bits; generating a virtual ID with a length of N bits by encrypting the bit string with a length of N bits in a manner that decryption of the encrypted bit string with a key K stored in the ONS proxy and the PML server is possible; and writing the virtual ID with a length of N bits to a tag by use of a tag writer.

The second embodiment of the invention can be perceived as an apparatus including a tag writer, a tag itself, a program for controlling an apparatus including a tag writer, a recording medium in which the program is stored, or as other program products.

In the above described outlines of the invention, all essential features of the invention are not listed. Subcombinations of these feature groups can also become an invention.

PREFERRED EMBODIMENT

The invention will now be described through embodiments of the invention. The embodiments described below, however, does not limit the invention according to the claims, and not all the combinations of the features described in the embodiments are essential as the means of the invention for solving the problems.

Embodiment 1

FIG. 1 is a high-level schematic diagram showing a network system according to a first embodiment of the invention. The network system includes a local server 103, an Object Naming Service (ONS) server 105, an ONS proxy 106 and a Physical Markup Language (PML) server 107 being communicatable with each other via a network 104. The local server 103 is connected to a tag reader 102 capable of reading data recorded on a Radio Frequency Identification (RFID) tag 101 that is coupled to (i.e., on or attached to) an article.

(Hardware Configuration)

FIG. 2 is an external view of a first exemplary RFID tag 101 being usable in the first embodiment of the invention. FIG. 3 is an external view of a second exemplary RFID tag 101 being usable in the first embodiment of the invention. FIG. 4 is an external view of an exemplary RFID tag reader/writer 102 being usable in the first embodiment of the invention.

According to the first embodiment, the RFID tag 101 includes an IC chip 201 or 301 and an antenna 202 or 302, each of the IC chips 201 and 301 including a logic circuit and a memory. The RFID tag 101 has a function of the logic circuit performing reading/writing from/to the memory based on the contents of communication with the RFID tag reader/writer 102 via the antenna 202 or 302. The first exemplary RFID tag 101 performs the communication with the RFID tag reader/writer 102 through electromagnetic induction. The second exemplary RFID tag 101 performs the communication with the RFID tag reader/writer 102 through microwave. Based on the standard specifications or the like, a person skilled in the art can arbitrarily design, manufacture or obtain the above described RFID tag 101 and RFID tag reader/writer 102, and hence detailed description thereof is omitted in the present specifications.

FIG. 5 is a diagram showing an exemplary hardware configuration of a computer that appropriately functions as the local server 103, ONS server 105, ONS proxy 106 or PML server 107 in the first embodiment of the invention. The computer apparatus includes a central processing unit (CPU) 1 and a main memory 4. The CPU 1 and main memory 4 are connected via a bus 2 to a hard disk device 13 serving as an auxiliary storage unit. Also, removal storages (external storage systems with exchangeable recording medium) including a flexible disk unit 20, a MO unit 28 and CD-ROM units 26 and 29 are connected to the bus 2 via a flexible disk controller 19, an IDE controller 25, a SCSI controller 27 and the like, which are related to the removal storages, respectively.

Storage media such as flexible disk, MO and CD-ROM are inserted into removal storages such as the flexible disk unit 20, MO unit 28 and CD-ROM units 26 and 29, respectively. On the flexible disk and the like, hard disk device 13 and ROM 14, there can be recorded computer program codes for giving instructions to the CPU, etc. in conjunction with operating system to implement the invention. The storage media with the recorded computer program therein is a computer program product. In order to execute the computer program, it is loaded into the main memory 4. The computer program can be compressed, and can also be divided to be recorded on plural media.

Further, the computer apparatus can include as user interface hardware a pointing device 7 such as a mouse, a keyboard 6 and a display 12 for providing visual data for the user. Also, a printer (not shown) can be connected via a parallel port 16, and a modem (not shown) can be connected via a serial port 15. The computer apparatus can communicate with another computer or the like through connection with a network via the serial port 15 and modem or via a communication adapter 18 (Ethernet® card or token ring card) or the like.

A loudspeaker 23 receives via an amplifier 22 audio signals obtained by performing D/A conversion (digital/analog conversion) by an audio controller 21, and outputs sounds. The audio controller 21 A/D converts (analog/digital converts) audio information received from a microphone 24, thus making it possible to capture audio information from outside the system into the system.

According to the above description, it will be easily understood that the computer apparatus according to the embodiment of the invention can be implemented by an information processing apparatus such as mainframe, workstation, ordinary personal computer (PC) or by a combination of these apparatuses. It is noted that these components are shown as an example and all the components are not essential for the invention.

Particularly, among the hardware components described above, even when removal storages such as flexible disk unit 20, MO unit 28 and CD-ROM units 26 and 29, parallel port 16, printer, serial port 15, modem, communication adapter 18, loudspeaker 23, audio controller 21, amplifier 22, microphone 24, etc. are removed, the embodiment of the invention is implementable. Thus, the above components may not be included in the computer apparatus according to the embodiment of the invention.

Various modifications such as distributing the function of each hardware component of the computer apparatus used to implement the invention to a combination of plural machines for implementation can be easily conceived by those skilled in the art. Of course, these modifications are concepts that can be included in the technical scope of the invention.

The computer apparatus can employ, as operating system, Window (®) operating system provided by Microsoft corp., AIX provided by International Business Machines Corp., MacOS provided by Apple Computer, Inc. or Linux or the like that supports GUI multi-window environment. The computer apparatus can also employ, as operating system, PC-DOS provided by International Business Machines Corp. or one with character-based environment such as MS-DOS provided by Microsoft corp. Also, the server 300 can employ OS Open provided by International Business Machines Corp., a real time OS such as Vx Works of Wind River Systems, Inc. or an operating system incorporated into a network computer such as Java (®) OS.

It can be understood from the above description that the computer apparatus is not limited to a particular operating system environment. Of course, the local server 103, ONS server 105, ONS proxy 106 or PML server 107 can be operated under a different operating system environment from each other.

The network 104 is a communication path that connects the local server 103, ONS server 105, ONS proxy 106 and PML server 107; it can be implemented by the Internet, for example. As is commonly known, the network 104 being the Internet performs connection between systems by use of TCP/IP (Transmission Control Protocol/Internet Protocol). In the network 104, mutually communicating systems are specified by use of IP address represented by global address or local address.

(Functional Block Configuration)

FIG. 6 is a functional block diagram of a network system according to the first embodiment of the invention. According to the embodiment of the invention, the local server 103 includes a tag reader/writer controller 1031, an ONS resolver 1032 and a PML requester 1033. The local server 103 is connected to the tag reader 102 capable of reading data recorded on the RFID tag 101. In order to acquire a virtual identifier (ID) to be described later, the tag reader/writer controller 1031 acquires data recorded on the RFID tag by controlling the tag reader/writer 102, wherein the data acquired by the tag reader/writer controller 1031 from the RFID tag includes a virtual ID.

In order to acquire the network address (IP address in this embodiment) of the PML server 107, the ONS resolver 1032 sends a network address request including the virtual ID (VID) acquired by the tag reader/writer controller 1031 to the network and obtains the network address of the PML server 107.

The PML requester 1033 accesses, by use of the network address of the PML server 107 which is obtained by the ONS resolver 1032 and the virtual ID, information (hereinafter referred to as PML information) on an article having an RFID tag attached thereon and being associated with the RFID tag, which information is recorded on the PML server 107.

On the ONS proxy 106, there is securely recorded a common key (K) 1061. In response to the request including the virtual ID from the ONS resolver 1032 of the local server 103, the ONS proxy 106 decrypts the virtual ID by use of the common key 1061 to acquire an article ID. Then, in order to generate a network address request to request the network address of the PML server which provides access to the information on article associated with the article ID, the ONS proxy 106 extracts a manufacturer ID (MID) from the article ID. The ONS proxy sends the network address request in which the extracted MID is included to the ONS server 105.

The ONS server 105 is constructed according to the specifications based on DNS server established by the standardization group, EPCGlobal. On the ONS server 105, there is recorded data to associate each manufacturer ID (MID) with the network address of a PML server 107 managed by a manufacturer indicated by the manufacturer ID. According to the first embodiment, in response to the network address request including the MID, the ONS server 105 returns the network address of the PML server 107 that provides access to the information on article associated with the article ID.

The PML server 107 includes a PML manager 1071 and a PML database 1072 that records PML information corresponding to each article ID. Also, on the PML server 107, there is securely recorded a common key (K) 1073. According to the embodiment, in response to the PML information request from the local server 103, the PML manager 1071 decrypts the virtual ID included in the PML information request by use of the common key (K) 1073 to acquire the article ID. Then, the PML manager 1071 identifies PML information corresponding to the article ID, retrieves the identified PML information from the PML database 1072, and provides (i.e., transmits) the retrieved PML information to the local server 103.

(Generation of Tag Data Including Virtual ID)

FIG. 7 is a first exemplary data structure of data recorded on an RFID tag 101 according to the first embodiment of the invention. According to the specifications established by the standardization group, EPCGlobal, by use of version number (VER) 701 of 8 bits, the data contents assigned to the remaining 88 bits can be defined. In the first example, in the remaining 88 bits, there is stored one virtual ID (VID) 702 generated based on article ID; in version number 701, there is stored a bit string indicating employment of such data structure.

FIG. 8 is a second exemplary data structure of data recorded on an RFID tag 101 according to the first embodiment of the invention. In the second example, in the remaining 88 bits, there is stored a virtual ID consisting of a first virtual ID (VID-1) 802 of 52 bits generated from manufacturer ID (MID) and product ID (PID) each included in article ID and a second virtual ID (VID-2) 803 of 36 bits generated from serial number (SNO) included in article ID; in version number (VER) 801, there is stored a bit string indicating employment of such data structure.

According to the embodiment, virtual ID is generated by applying an appropriate encryption process to article ID. Article ID can be calculated by applying an appropriate decryption process to virtual ID. Also, according to the embodiment of the invention, for the purpose of protecting privacy, virtual ID preferably fulfills a condition, i.e. Indistiguishable, in which even when mapping with respect to a pair of a given article ID and virtual ID is known, mapping with respect to another virtual ID can not be known. If the above described Indistiguishable is fulfilled, for example, even when the user makes public the retrieval result of a virtual ID, the user can know only the mapping of the above virtual ID and article ID and can not know any mapping with respect to another virtual ID. According to the first embodiment, to meet the above described requirement, a bit string of a virtual ID is generated according to the following method.

FIG. 10 is a flowchart showing an exemplary flow of a method for generating a virtual ID according to the first embodiment of the invention.

The process starts with step 1001, and an article ID is acquired (step 1002). Here, if a correspondence between article ID and virtual ID is one—one, Indistinguishable can not be fulfilled. Thus, in order to associate one article ID with plural virtual IDs, the number of bits of article ID is smaller than that of virtual ID, as shown in FIG. 9. According to the embodiment, in order to associate one article ID with virtual IDs on the order of 220, when a virtual ID of 88 bits is generated, an article ID of 68 bits consisting of MID 901 of 24 bits, PID 902 of 20 bits and SNO 903 of 24 bits is employed. Subsequently, a random number R of 20 bits is generated (step 1003) and then digits of the random number R is distributed within the article ID (step 1004) according to an "All-or-Nothing Transformation (AONT)" algorithm, and then the article ID having the random number R distributed therein is encrypted with the key K in a manner that decryption with the common key stored in the ONS proxy and PML server is possible (step 1005).

The above process is expressed by the following formula, where known block cipher OFB mode such as DES can be employed as encryption function E, and K is a key of DES, and IV is the initial vector.

$$VID=E_{K,IV}(AONT(MID\|PID\|SNO,R))$$

In AONT algorithm, the random number effect of the random number R is distributed over the entire cipher text, whereby when any single bit of the cipher text is lost, the cipher text can not be decrypted into a clear text. For example, OAEP known as cipher padding of RSA is one of the methods for implementing AONT. According to the embodiment, as AONT function used in step 1004, there is employed OAEP to be described below in detail.

FIG. 11 is a flowchart showing OAEP algorithm used to generate a virtual ID according to the first embodiment of the invention.

The process starts with step 1101. First the random number R generated in step 1003 is hashed by a hash function F()that outputs a hash value of 68 bits to obtain F(R) (step 1102), and then there is generated X being an exclusive OR between the article ID of 68 bits and the F(R) (step 1103). The article ID is denoted as RID in step 1103 in FIG. 11. Further, X is hashed by a hash function G( ) that outputs a hash value of 20 bits to generate G(X) (step 1104), and then there is generated Y being an exclusive OR between the random number R of 20 bits and G(X) (step 1105). Finally, X and Y are joined together (e.g., by concatenating X and Y) (step 1106) to generate a bit string Z, wherein Z is the article ID (RID) having the random number R distributed therein. By executing the above steps, there is generated the bit string Z with a length of 88 bits to be encrypted using the key K in step 1005, thereby finishing the process (step 1107). The above described process is expressed by the following formulas.

$$X=XOR(MID\|PID\|SNO,F(R))$$

$$Y=XOR(R,G(X))$$

$$Z=X\|Y$$

Taking into consideration the first exemplary data structure of data recorded on RFID tag, the method for generating a virtual ID was described above. However, it will be easily understood by those skilled in the art that also in the second example, by use of a similar method as illustrated in FIG. 8, VID-1 is generated by applying a random number of 8 bits to one part (44 bits) of the article ID consisting of MID (24 bits) and PID (20 bits), and VID-2 is generated by applying a random number of 12 bits to SNO part (24 bits) of the article ID.

By executing the above described steps, a virtual ID of 88 bits is obtained, and the process for the first example is finished (step 1006). The virtual ID generated by the above described method is written into the RFID tag 101 together with the version number by use of the tag writer 102.

(Method for Accessing Information on Article with a Tag Attached Thereon)

FIG. 12 is a flowchart showing an exemplary flow of a method for accessing PML information according to the first embodiment of the invention.

The process starts with step 1201, and the tag reader 102 reads tag data from the RFID tag 101. The read tag data is given to the local server 103 (step 1202). The local server 103 generates an ONS proxy address request having "VID. VER. onsroot. org" including virtual ID (VID) and version number (VER) as target URL (Uniform Resource Locator) and sends it to the ONS server 105 (step 1203).

When receiving the ONS proxy address request sent from the local server 103 in step 1203, the ONS server returns, in response to the version information (VER) indicating that virtual ID is included in the tag being included in the request, the IP address of the ONS proxy 106 to the local server 103. Then, by use of the IP address of the ONS proxy 106, the local server 103 returns an ONS service request including VID to the ONS proxy (step 1204).

When receiving the ONS service request, the ONS proxy 106 decrypts the VID included in the request by use of the common key 1061 which the ONS proxy 106 holds to obtain an article ID (step 1205), and then extracts manufacturer ID (MID) included in the article ID to return a request having "MID.onsroot.org" including the MID as target URL to the ONS server 105 (step 1206). The ONS server 105 identifies the IP address of the PML server from the MID included in the request and returns it to the local server 103 (step 1207).

By use of the IP address of the PML server 107, the local server 103 sends a PML service request including VID to the PML server 107 (step 1208). By use of the common key 1073, the PML server 107 decrypts the VID included in the received PML service request to obtain an article ID. By use of the article ID, the PML server 107 identifies PML information to be provided and provides it for the local server 103 (step 1209), thereby finishing the process (step 1210). According to the embodiment, by executing the above described steps, the local server 103 can access the PML information stored in the PML database of the PML server 107.

Embodiment 2

FIG. 13 is a high-level schematic diagram showing a network system according to a second embodiment of the invention. According to the second embodiment of the invention, the network system includes local servers 103a to 103c, an ONS server 105, an ONS proxy 106 and a PML servers 107a to 107c, which are communicatable with each other via a network 104.

It should be noted that according to the second embodiment of the invention, the network system includes a plurality of local servers each with a tag reader/writer connected thereto and a plurality of PML servers. In explaining the second embodiment of the invention, tag reader/writers 102a to 102c, local servers 103a to 103c and PML servers 107a to 107c are often generically referred to as tag reader/writer 102, local server 103 and PML server 107, respectively.

(Hardware Configuration)

According to the second embodiment of the invention, RFID tag 101, tag reader/writer 102, local server 103, network 104, ONS server 105, ONS proxy 106 and PML server 107 can be realized with hardware similar to that of the first embodiment. Thus, regarding the second embodiment, the description of hardware configuration of each component is omitted.

(Functional Block Configuration)

FIG. 14 is a functional block diagram of a network system according to the second embodiment of the invention. According to the second embodiment of the invention, similarly to the first embodiment, the local server 103 includes a tag reader/writer controller 1031, an ONS resolver 1032 and a PML requester 1033. Also, according to the second embodiment, the local server 103 includes an authentication mechanism 1034. The authentication mechanism 1034 performs authentication with the ONS proxy 106 and stores a credential obtained as a result of authentication. The credential stored in the authentication mechanism 1034 is used by the PML server 107 determining, in response that a PML information request is received from PML requester 1033, whether or not access to recorded PML information is permissible.

According to the second embodiment, a different security level is given to each of the local servers 103a to 103c (or tag readers/writers 102a to 102c). Specifically, assume that: with the connected tag reader/writer 102a installed in a public space, the local server 103a is anon-secure one with no credential given thereto; with the connected tag reader/writer 102b installed in an ordinary retail shop, the local server 103b is a low-level secure one with a low-level credential given thereto; and with the connected tag reader/writer 102c managed by the manufacturer of article with a tag attached thereon, the local server 103c is a high-level secure one with a high-level credential given thereto.

Similarly to the first embodiment, on the ONS proxy 106, there is securely recorded a common key (K) 1061. According to the second embodiment, the ONS proxy 106 further includes an authentication mechanism 1062, and supplies a credential in accordance with authentication level to the local server 103 in response that authentication is properly performed with the authentication mechanism 1034 of the local server 103. The ONS proxy 106 according to the second embodiment has a function of requesting the network address of a different PML server 107 from the ONS server 105 based on a result of authentication performed with the local server 103.

The ONS server 105, which can be realized by a configuration similar to that of the first embodiment, has a function of sending back the network address of a PML server 107 in response to a request.

According to the first embodiment, the PML server 107 includes a PML manager 1071, a PML database 1072 and a securely recorded common key (K) 1073. According to the second embodiment, the PML server 107 further includes an authentication mechanism 1074. The authentication mechanism 1074 has a function of determining, according to a credential that a local server 103 requesting PML information holds, whether or not access to PML information recorded on the PML database 1072 is permissible.

FIG. 15 is a flowchart showing an exemplary flow of a method for accessing PML information according to the second embodiment.

The process starts with step 1501. The tag reader 102 reads tag data including at least one virtual ID (VID) from the RFID tag 101. VID can be generated by a method similar to one which was described regarding the first embodiment.

The read tag data is given to the local server 103 (step 1502). The local server 103 generates a request having "VID.VER.onsroot.org" including virtual ID (VID) and version number (VER) as target URL (Uniform Resource Locator) and sends it to the ONS server 105 (step 1503).

When receiving the request sent from the local server 103 in step 1503, the ONS server 105 returns the IP address of the ONS proxy 106 to the local server 103 based on the request. Then, by use of the IP address of the ONS proxy 106, the local server 103 sends an ONS service request including VID to the ONS proxy 106 (step 1504).

The above described steps are similar to those in the first embodiment. Subsequently, according to the second embodiment, the ONS proxy 106 performs authentication with the local server 103 which sent the ONS service request (step 1505). If authentication fails in step 1505, then the flow proceeds from step 1506 through arrow No to step 1508 without issuing any credential. In the second embodiment, assume that the authentication between the non-secure local server 103a and ONS proxy 105 fails, thus issuing no credential.

If the authentication is properly performed in step 1505, then the flow proceeds from step 1506 to arrow Yes, and authentication level is determined. Those skilled in the art can appropriately design and implement a method for determining authentication level. For example, authentication level can be determined by the IP address of local server, the ID of tag reader/writer or the like, which are preliminarily registered. Then, a credential corresponding to the determined authentication level is issued to the local server 103 (step 1507).

In the second embodiment, assume that: low-level authentication is properly performed with respect to the local server 103b with low-security level given thereto, whereby a low-level credential is issued; high-level authentication is properly performed with respect to the local server 103c with high-security level given thereto, whereby a high-level credential is issued.

Subsequently, the ONS proxy 106 decrypts VID included in the request by use of common key (K) 1061 to obtain an article ID (step 1508), and extracts manufacturer ID (MID) included in the article ID to send a request having "MID.onsroot.org" including the MID as target URL to the ONS server 105 (step 1509). According to the second embodiment, the ONS proxy 106 generates a different target URL based on a result of authentication of step 1506.

Specifically, the ONS proxy 106 generates "MID.non_secure.onsroot.org" with respect to the local server 103a for which authentication has failed, and generates "MID.low_secure.onsroot.org" with respect to the local server 103b for which low-level authentication has been properly performed, and generates "MID.high_secure.onsroot.org" with respect to the local server 103c for which high-level authentication has been properly performed.

When receiving the request, the ONS server 105 identifies the IP address of an appropriate PML server 107 from the MID and security level included in the request and returns it to the local server 103 (step 1510). It should be noted that the returned IP address can change according to the contents of target URL.

Specifically, according to the second embodiment, the ONS server 105 returns the IP address of PML server 107a to the local server 103a, and returns the IP address of PML server 107b to the local server 103b, and returns the IP address of PML server 107c to the local server 103c.

By use of the acquired IP address of PML server 107, the local server 103 sends a PML service request including VID to the PML server 107 (step 1511). When receiving the PML service request, the PML server 107 firstly determines whether or not the server itself is a secure site (step 1512).

If it is determined in step 1512 that the PML server 107 is not a secure site, then the flow proceeds through arrow No to step 1514 because the PML information stored in the above PML server 107 is accessible by anyone. If it is determined in step 1512 that the PML server 107 is a secure site, then the PML server 107 certifies, by use of authentication mechanism 1074 whether or not the local server 103 which has sent the PML service request holds an appropriate credential (step 1513).

If the authentication mechanism 1074 of PML server 107 determines in step 1513 that the local server 103 holds an appropriate credential, the flow proceeds through arrow Yes to step 1514. In step 1514, the PML server 107 decrypts VID included in the PML service request by use of the common key (K) 1073 to obtain an article ID. By use of the article ID, the PML server 107 identifies PML information to be provided, and then provides it for the local server 103, thereby finishing the process (step 1516).

If the authentication mechanism 1074 of PML server 107 determines in step 1513 that the local server 103 does not holds an appropriate credential, then the flow proceeds through arrow No to step 1515, and the PML server 107 rejects access to PML information by the local server 103 (step 1515), thereby finishing the process (step 1516).

The previous description is of preferred examples for implementing the invention, and the technical scope of the invention should not be restrictively interpreted by the description of the embodiment but be defined by the claims. Those skilled in the art will recognize that many changes or modifications to the embodiments described above are possible. For example, while the above embodiments are described under an assumption that encryption and decryption of virtual ID are performed with a secret key cryptography using a common key, encryption and decryption of virtual ID may of course be performed with a public key cryptography using a pair of secret key and public key. Further, for example, while ONS proxy and ONS server is constructed as separate hardware in the above described embodiments, the functions of ONS proxy and ONS server may be implemented by the same hardware. Specifically, those skilled in the art can easily and properly design the hardware arrangement and implementation of servers, functional blocks, program modules and the like each described above in the embodiments. It will be apparent from the description of the claims that an embodiment with such changes or modifications applied thereto can also be included in the technical scope of the invention.

BRIEF DESCRIPTION OF THE DRAWINGS

FIG. 1 is a high-level schematic diagram showing a network system according to a first embodiment of the invention;

FIG. 2 is an external view of a first exemplary RFID tag being usable in the first embodiment of the invention;

FIG. 3 is an external view of a second exemplary RFID tag being usable in the first embodiment of the invention;

FIG. 4 is an external view of an exemplary tag reader/writer being usable in the first embodiment of the invention;

FIG. 5 is a diagram showing an exemplary hardware configuration of a computer apparatus that functions as a local server, etc. in the first embodiment of the invention;

FIG. 6 is a functional block diagram of the network system according to the first embodiment of the invention;

FIG. 7 is an image of a first exemplary data structure of data stored in RFID tag according to the first embodiment of the invention;

FIG. 8 is an image of a second exemplary data structure of data stored in RFID tag according to the first embodiment of the invention;

FIG. 9 is an image of data structure of an article ID according to the first embodiment of the invention;

FIG. 10 is a flowchart showing an exemplary flow of a method for generating a virtual ID according to the first embodiment of the invention;

FIG. 11 is a flowchart showing OAEP algorithm used to generate a virtual ID according to the first embodiment of the invention;

FIG. 12 is a flowchart showing an exemplary flow of a method for accessing PML information according to the first embodiment of the invention;

FIG. 13 is a high-level schematic diagram showing a network system according to a second embodiment of the invention;

FIG. 14 is a functional block diagram of the network system according to the second embodiment of the invention;

FIG. 15 is a flowchart showing an exemplary flow of a method for accessing PML information according to the second embodiment of the invention;

FIG. 16 is an overall image of a network system according to prior art; and

FIG. 17 is an image of data structure of data stored in RFID tag according to prior art.

DESCRIPTION OF SYMBOLS

101 . . . RFID tag
102 . . . Tag reader/writer
103 . . . Local server
104 . . . Internet
105 . . . ONS server
106 . . . ONS proxy
107 . . . PML server
201, 301 . . . IC chip
202, 302 . . . Antenna

The invention claimed is:

1. A method for providing access to information on an article to which a tag is coupled, said method comprising:
  reading, by a local server, the tag, wherein the tag comprises at least one virtual identifier (ID), wherein the at least one virtual ID comprises an encryption of at least one bit string, wherein the at least one bit string includes an article ID that identifies the article, wherein the article ID includes a manufacturer ID pertaining to the article, and wherein the local server, an Object Naming Service (ONS) server, an ONS proxy server, and a Physical Markup Language (PML) server are communicatively coupled to each other via a network;
  after said reading the at least one virtual ID, sending, by the local server to the ONS proxy server, an ONS service request that includes the at least one virtual ID and requests a network address of the PML server, wherein the ONS proxy server is configured to determine the article ID by decrypting the at least one virtual ID, to extract the manufacturer ID from the article ID, and to transmit the manufacturer ID to the ONS server, and wherein the ONS server is configured to determine the network address of the PML server based on the manufacturer ID;
  after said sending the ONS service request, receiving, by the local server from the ONS server, the network address of the PML server;
  sending, by the local server to the PML server at the network address of the PML server received from the ONS server, a PML information request that includes the virtual ID and requests article information pertaining to the article, wherein the PML server is configured to determine the article ID by decrypting the at least one virtual ID, to identify the article information based on the article ID, to retrieve the identified article information from a database, and to transmit the retrieved article information to the local server; and
  after said sending the PML information request, receiving, by the local server from the PML server, the article information,
  wherein the at least one bit string includes at least one random number distributed within the article ID.

2. The method of claim 1,
wherein the at least one virtual ID consists of a first virtual ID,
wherein the at least one bit string consists of a first bit string (Z),
wherein the first virtual ID is an encryption of the first bit string,
wherein the at least one random number consists of a first random number (R),
wherein F(R) denotes a hash of R,
wherein RID denotes the articles ID,
wherein X denotes an exclusive OR between RID and F(R),
wherein G(X) denotes a hash of X,
wherein Y denotes an exclusive OR between R and G(X), and
wherein Z is X and Y joined together.

3. The method of claim 1,
wherein the at least one virtual ID consists of a first virtual ID and a second virtual ID,
wherein the at least one bit string consists of a first bit string and a second bit string,
wherein the first virtual ID is an encryption of the first bit string,
wherein the second virtual ID is an encryption of the second bit string,
wherein the at least one random number consists of a first random number and a second random number,
wherein the article ID consists of the manufacturer ID, a product ID, and a serial number ID,
wherein the first bit string consists of the first random number distributed within one part of the article ID consisting of the manufacturer ID and the product ID, and
wherein the second bit string consists of the second random number distributed within the serial number ID.

4. A computer program product, comprising at least one computer readable storage device having computer readable program code embodied therein, said computer readable program code comprising instructions configured to implement the method of claim 1.

5. A method for providing access to information on an article to which a tag is coupled, said method comprising:
reading, by a local server, the tag, wherein the tag comprises at least one virtual identifier (ID), wherein the at least one virtual ID comprises an encryption of at least one bit string, wherein the at least one bit string includes an article ID that identifies the article, wherein the article ID includes a manufacturer ID pertaining to the article, and wherein the local server, an Object Naming Service (ONS) server, an ONS proxy server, and a Physical Markup Language (PML) server are communicatively coupled to each other via a network;
after said reading the at least one virtual ID, sending, by the local server to the ONS proxy server, an ONS service request that includes the at least one virtual ID and requests a network address of the PML server, wherein the ONS proxy server is configured to determine the article ID by decrypting the at least one virtual ID, to extract the manufacturer ID from the article ID, and to transmit the manufacturer ID to the ONS server, and wherein the ONS server is configured to determine the network address of the PML server based on the manufacturer ID;
after said sending the ONS service request, receiving, by the local server from the ONS server, the network address of the PML server;
sending, by the local server to the PML server at the network address of the PML server received from the ONS server, a PML information request that includes the virtual ID and requests article information pertaining to the article, wherein the PML server is configured to determine the article ID by decrypting the at least one virtual ID, to identify the article information based on the article ID, to retrieve the identified article information from a database, and to transmit the retrieved article information to the local server; and
after said sending the PML information request, receiving, by the local server from the PML server, the article information,
wherein the tag further comprises a version number indicating that the tag comprises the at least one virtual ID, and
wherein the method further comprises:
sending, by the local server to the ONS server after said reading the at least one virtual ID, an ONS proxy address request that includes the at least one virtual ID and the version number and requests an Internet Protocol (IP) address of the ONS proxy server; and
after said sending the ONS proxy address request and before said sending the ONS service request, receiving, by the local server from the ONS server, the IP address of the ONS proxy server, wherein said sending the ONS service request comprises sending the ONS service request to the ONS proxy server at the received IP address of the ONS proxy server.

6. A method for providing access to information on an article to which a tag is coupled, said method comprising:
reading, by a local server, the tag, wherein the tag comprises at least one virtual identifier (ID), wherein the at least one virtual ID comprises an encryption of at least one bit string, wherein the at least one bit string includes an article ID that identifies the article, wherein the article ID includes a manufacturer ID pertaining to the article, and wherein the local server, an Object Naming Service (ONS) server, an ONS proxy server, and a Physical Markup Language (PML) server are communicatively coupled to each other via a network;
after said reading the at least one virtual ID, sending, by the local server to the ONS proxy server, an ONS service request that includes the at least one virtual ID and requests a network address of the PML server, wherein the ONS proxy server is configured to determine the article ID by decrypting the at least one virtual ID, to extract the manufacturer ID from the article ID, and to transmit the manufacturer ID to the ONS server, and wherein the ONS server is configured to determine the network address of the PML server based on the manufacturer ID;
after said sending the ONS service request, receiving, by the local server from the ONS server, the network address of the PML server;
sending, by the local server to the PML server at the network address of the PML server received from the ONS server, a PML information request that includes the virtual ID and requests article information pertaining to the article, wherein the PML server is configured to determine the article ID by decrypting the at least one virtual ID, to identify the article information based on the article ID, to retrieve the identified article information from a database, and to transmit the retrieved article information to the local server; and after said sending the PML information request, receiving, by the local server from the PML server, the article information,
wherein the method further comprises:
receiving, by ONS proxy server, the ONS service request sent by the local server; and
processing, by the ONS proxy server, the received ONS service request, wherein said processing the ONS service request comprises: determining the article ID by decrypting the at least one virtual ID through use of a key K; extracting the manufacturer ID from the article ID; and transmitting the manufacturer ID to the ONS server.

7. The method of claim 6, wherein the method further comprises:
receiving, by the ONS server, the manufacturer ID transmitted by the ONS proxy server; and
determining by the ONS server, the network address of the PML server based on the manufacturer ID.

8. The method of claim 7, wherein the method further comprises:
receiving, by the PML server, the PML information request sent by the local server; and
processing, by the PML server, the received PML information request, wherein said processing the PML information request comprises:
determining the article ID by decrypting the at least one virtual ID through use of the key K;
identifying, the article information based on the article ID;
retrieving the identified article information from a database; and
transmit ting the article information to the local server.

9. The method of claim 8, wherein the method further comprises:
performing authentication between the local server and the ONS proxy; and
determining, by the PML server, that said performing authentication was successful, wherein said sending the article information by the PML server to the local server is responsive to said determining by the PML server that said performing authentication was successful.

10. The method of claim 9, wherein said performing authentication comprises receiving a credential by the local server based on a result of said performing authentication, wherein the method further comprises receiving the credential by the PML server as a result of transmission of the credential by the local server to the PML server, and wherein said determining by the PML server that said performing authentication was successful is based on content of the credential received by the PML server.

11. A computer system comprising a local server, wherein the local server comprises a processor and at least one computer readable memory unit coupled to the processor of the local server, said at least one computer readable memory unit of the local server containing instructions that when executed by the processor of the local server implement a method for providing access to information on an article to which a tag is coupled, said method comprising:
reading, by the local server, the tag, wherein the tag comprises at least one virtual identifier (ID), wherein the at least one virtual ID comprises an encryption of at least one bit string, wherein the at least one bit string includes an article ID that identifies the article, wherein the article ID includes a manufacturer ID pertaining to the article, and wherein the local server, an Object Naming Service (ONS) server, an ONS proxy server, and a Physical Markup Language (PML) server are communicatively coupled to each other via a network;
after said reading the at least one virtual ID, sending, by the local server to the ONS proxy server, an ONS service request that includes the at least one virtual ID and requests a network address of the PML server, wherein the ONS proxy server is configured to determine the article ID by decrypting the at least one virtual ID, to extract the manufacturer ID from the article ID, and to transmit the manufacturer ID to the ONS server, and wherein the ONS server is configured to determine the network address of the PML server based on the manufacturer ID;
after said sending the ONS service request, receiving, by the local server from the ONS server, the network address of the PML server;
sending, by the local server to the PML server at the network address of the PML server received from the ONS server, a PML information request that includes the virtual ID and requests article information pertaining to the article, wherein the PML server is configured to determine the article ID by decrypting the at least one virtual ID, to identify the article information based on the article ID, to retrieve the identified article information from a database, and to transmit the retrieved article information to the local server; and
after said sending the PML information request, receiving, by the local server from the PML server, the article information.

12. A computer system comprising a local server, wherein the local server comprises a processor and at least one computer readable memory unit coupled to the processor of the local server, said at least one computer readable memory unit of the local server containing instructions that when executed by the processor of the local server implement a method for providing access to information on an article to which a tag is coupled, said method comprising:
reading, by the local server, the tag, wherein the tag comprises at least one virtual identifier (ID), wherein the at least one virtual ID comprises an encryption of at least one bit string, wherein the at least one bit string includes an article ID that identifies the article, wherein the article ID includes a manufacturer ID pertaining to the article, and wherein the local server, an Object Naming Service (ONS) server, an ONS proxy server, and a Physical Markup Language (PML) server are communicatively coupled to each other via a network;
after said reading the at least one virtual ID, sending, by the local server to the ONS proxy server, an ONS service request that includes the at least one virtual ID and requests a network address of the PML server, wherein the ONS proxy server is configured to determine the article ID by decrypting the at least one virtual ID, to extract the manufacturer ID from the article ID, and to transmit the manufacturer ID to the ONS server, and wherein the ONS server is configured to determine the network address of the PML server based on the manufacturer ID;
after said sending the ONS service request, receiving, by the local server from the ONS server, the network address of the PML server;
sending, by the local server to the PML server at the network address of the PML server received from the ONS server, a PML information request that includes the virtual ID and requests article information pertaining to the article, wherein the PML server is configured to determine the article ID by decrypting the at least one virtual ID, to identify the article information based on the article ID, to retrieve the identified article information from a database, and to transmit the retrieved article information to the local server; and after said sending the PML information request, receiving, by the local server from the PML server, the article information, wherein the at least one bit string includes at least one random number distributed within the article ID.

13. The computer system of claim 12,
wherein the at least one virtual ID consists of a first virtual ID,
wherein the at least one bit string consists of a first bit string (Z),
wherein the first virtual ID is an encryption of the first bit string,
wherein the at least one random number consists of a first random number (R),
wherein F(R) denotes a hash of R,
wherein RID denotes the articles ID,
wherein X denotes an exclusive OR between RID and F(R),
wherein G(X) denotes a hash of X,
wherein Y denotes an exclusive OR between R and G(X), and
wherein Z is X and Y joined together.

14. The computer system of claim 12,
wherein the at least one virtual ID consists of a first virtual ID and a second virtual ID,
wherein the at least one bit string consists of a first bit string and a second bit string,
wherein the first virtual ID is an encryption of the first bit string,
wherein the second virtual ID is an encryption of the second bit string,
wherein the at least one random number consists of a first random number and a second random number,
wherein the article ID consists of the manufacturer ID, a product ID, and a serial number ID,
wherein the first bit string consists of the first random number distributed within one part of the article ID consisting of the manufacturer ID and the product ID, and
wherein the second bit string consists of the second random number distributed within the serial number ID.

15. A computer system comprising a local server, wherein the local server comprises a processor and at least one computer readable memory unit coupled to the processor of the local server, said at least one computer readable memory unit of the local server containing instructions that when executed by the processor of the local server implement a method for providing access to information on an article to which a tag is coupled, said method comprising:

reading, by the local server, the tag, wherein the tag comprises at least one virtual identifier (ID), wherein the at least one virtual ID comprises an encryption of at least one bit string, wherein the at least one bit string includes an article ID that identifies the article, wherein the article ID includes a manufacturer ID pertaining to the article, and wherein the local server, an Object Naming Service (ONS) server, an ONS proxy server, and a Physical Markup Language (PML) server are communicatively coupled to each other via a network;

after said reading the at least one virtual ID, sending, by the local server to the ONS proxy server, an ONS service request that includes the at least one virtual ID and requests a network address of the PML server, wherein the ONS proxy server is configured to determine the article ID by decrypting the at least one virtual ID, to extract the manufacturer ID from the article ID, and to transmit the manufacturer ID to the ONS server, and wherein the ONS server is configured to determine the network address of the PML server based on the manufacturer ID;

after said sending the ONS service request, receiving, by the local server from the ONS server, the network address of the PML server;

sending, by the local server to the PML server at the network address of the PML server received from the ONS server, a PML information request that includes the virtual ID and requests article information pertaining to the article, wherein the PML server is configured to determine the article ID by decrypting the at least one virtual ID, to identify the article information based on the article ID, to retrieve the identified article information from a database, and to transmit the retrieved article information to the local server; and after said sending the PML information request, receiving, by the local server from the PML server, the article information, wherein the tag further comprises a version number indicating that the tag comprises the at least one virtual ID, and wherein the method further comprises:
sending, by the local server to the ONS server after said reading the at least one virtual ID, an ONS proxy address request that includes the at least one virtual ID and the version number and requests an Internet Protocol (IP) address of the ONS proxy server; and
after said sending the ONS proxy address request and before said sending the ONS service request, receiving, by the local server from the ONS server, the IP address of the ONS proxy server, wherein said sending the ONS service request comprises sending the ONS service request to the ONS proxy server at the received IP address of the ONS proxy server.

16. A computer system comprising a local server, wherein the local server comprises a processor and at least one computer readable memory unit coupled to the processor of the local server, said at least one computer readable memory unit of the local server containing instructions that when executed by the processor of the local server implement a method for providing access to information on an article to which a tag is coupled, said method comprising:

reading, by the local server, the tag, wherein the tag comprises at least one virtual identifier (ID), wherein the at least one virtual ID comprises an encryption of at least one bit string, wherein the at least one bit string includes an article ID that identifies the article, wherein the article ID includes a manufacturer ID pertaining to the article, and wherein the local server, an Object Naming Service (ONS) server, an ONS proxy server, and a Physical Markup Language (PML) server are communicatively coupled to each other via a network;

after said reading the at least one virtual ID, sending, by the local server to the ONS proxy server, an ONS service request that includes the at least one virtual ID and requests a network address of the PML server, wherein the ONS proxy server is configured to determine the article ID by decrypting the at least one virtual ID, to extract the manufacturer ID from the article ID, and to transmit the manufacturer ID to the ONS server, and wherein the ONS server is configured to determine the network address of the PML server based on the manufacturer ID;
after said sending the ONS service request, receiving, by the local server from the ONS server, the network address of the PML server;
sending, by the local server to the PML server at the network address of the PML server received from the ONS server, a PML information request that includes the virtual ID and requests article information pertaining to the article, wherein the PML server is configured to determine the article ID by decrypting the at least one virtual ID, to identify the article information based on the article ID, to retrieve the identified article information from a database, and to transmit the retrieved article information to the local server; and
after said sending the PML information request, receiving, by the local server from the PML server, the article information,
wherein the computer system further comprises the ONS proxy server,
wherein the ONS proxy server comprises a processor and at least one computer readable memory unit coupled to the processor of the ONS proxy server, said at least one computer readable memory unit of the ONS proxy server containing instructions that when executed by the processor of the ONS proxy server further implement the method, and
wherein the method further comprises:
receiving, by ONS proxy server, the ONS service request sent by the local server; and
processing, by the ONS proxy server, the received ONS service request, wherein said processing the ONS service request comprises: determining the article ID by decrypting the at least one virtual ID through use of a key K; extracting the manufacturer ID from the article ID; and transmitting the manufacturer ID to the ONS server.

17. The computer system of claim 16, wherein the computer system further comprises the ONS server, wherein the ONS server comprises a processor and at least one computer readable memory unit coupled to the processor of the ONS server, said at least one computer readable memory unit of the ONS server containing instructions that when executed by the processor of the ONS server further implement the method, and wherein the method further comprises:
receiving, by the ONS server, the manufacturer ID transmitted by the ONS proxy server;
and determining by the ONS server, the network address of the PML server based on the manufacturer ID.

18. The computer system of claim 17, wherein the computer system further comprises the PML server, wherein the PML server comprises a processor and at least one computer readable memory unit coupled to the processor of the PML server, said at least one computer readable memory unit of the PML server containing instructions that when executed by the processor of the PML server further implement the method, and wherein the method further comprises:
receiving, by the PML server, the PML information request sent by the local server; and
processing, by the PML server, the received PML information request, wherein said processing the PML information request comprises:
determining the article ID by decrypting the at least one virtual ID through use of the key K;
identifying, the article information based on the article ID;
retrieving the identified article information from a database; and
transmit ting the article information to the local server.

19. The computer system of claim 18, wherein the method further comprises:
performing authentication between the local server and the ONS proxy; and
determining, by the PML server, that said performing authentication was successful, wherein said sending the article information by the PML server to the local server is responsive to said determining by the PML server that said performing authentication was successful.

20. The computer system of claim 19, wherein said performing authentication comprises receiving a credential by the local server based on a result of said performing authentication, wherein the method further comprises receiving the credential by the PML server as a result of transmission of the credential by the local server to the PML server, and wherein said determining by the PML server that said performing authentication was successful is based on content of the credential received by the PML server.

* * * * *